United States Patent [19]

Power

[11] Patent Number: 4,984,907
[45] Date of Patent: Jan. 15, 1991

[54] GREASE ABSORBENT DEVICE

[76] Inventor: Brenda Power, 2452 E. Evergreen, Mesa, Ariz. 85203

[21] Appl. No.: 390,535

[22] Filed: Aug. 7, 1989

[51] Int. Cl.$^5$ .......................................... B65D 30/02
[52] U.S. Cl. .................... 383/109; 383/113; 383/117; 206/204
[58] Field of Search ............ 383/109, 113, 117, 120; 206/204; 426/124

[56] References Cited

U.S. PATENT DOCUMENTS

| | | | |
|---|---|---|---|
| 2,022,251 | 11/1935 | Mallay et al. | 383/110 X |
| 2,126,203 | 8/1938 | Miskella | 383/120 X |
| 2,563,933 | 8/1951 | Hipps et al. | 383/117 X |
| 3,026,209 | 3/1962 | Niblack et al. | 426/124 |
| 3,342,613 | 9/1967 | Schelhorn | 383/109 X |
| 3,515,331 | 6/1970 | Guthrie, Sr. | 206/204 X |
| 4,321,997 | 3/1982 | Miller | 206/204 |
| 4,515,840 | 5/1985 | Gatward | 383/113 X |
| 4,735,308 | 4/1988 | Barner | 383/109 X |
| 4,797,010 | 1/1989 | Coelho | 383/113 X |
| 4,861,632 | 8/1989 | Caggiano | 383/109 X |

FOREIGN PATENT DOCUMENTS 1552810  9/1979  United Kingdom ................ 383/109

Primary Examiner—Stephen Marcus
Assistant Examiner—Jes F. Pascua
Attorney, Agent, or Firm—Richard R. Mybeck

[57] ABSTRACT

A multiple layered device and method of using same for safely and efficiently removing excess fats and oils from fried and grilled foods immediately after cooking, prior to consumption. An outer grease impervious body portion is covered on the inner surface thereof with a grease absorbent material which in turn is overlaid with a foraminous grid which separates the food from the absorbent material while permitting the passage of grease therethrough. The device is disposable in an ecologically acceptable manner.

15 Claims, 1 Drawing Sheet

GREASE ABSORBENT DEVICE

INTRODUCTION

The present invention relates to a novel grease absorbent device and more particularly to a unique grease/fat/oil absorptive utensil for use in commerical or home kitchen to absorb and capture excessive oleaginous material from grilled or fried foods.

BACKGROUND OF THE INVENTION

During the last several years, medical research has found that the ingestion of even moderate amounts of fats/oils/grease will eventually lead to more serious and life threatening diseases. Furthermore, the high caloric content of such fats poses a weight problem for some individuals when ingested in more than minute quantities.

Yet cooking with fats/oils or the like, imparts a distinctive and pleasurable flavor to various foods such as meat and like tissue products and various vegetables. In some instances, the food product is precoated with flour, cornmeal, crackermeal and the like to help absorb the excess oleaginous materials (herein generally referred to as "grease" ) giving the appearance of eliminating the grease, however, the excess grease remains in the coating and unless the coating is stripped from the product before ingestion, the grease is consumed just as before.

Another problem encountered when frying or grilling food, arises from the difficulty in handling such very hot foods which are covered with dripping fat or oil. The present invention also helps to ameliorate this risk of burns from such food as well as aleviate the problem of excessive grease on the food.

The use of absorbent material in the packaging, storage, and transportation of raw food products has been heretofore taught by Niblack et al (U.S. Pat. No. 3,026,209), Coelho (U.S. Pat. No. 4,797,010) and others. These prior art devices were primarily employed in the dispensing, storage, reheating, or transportation of food stuffs. Leon et al (U.S. Pat. No. 4,664,922), discloses a package which is compartmentalized by an intermediate horizontal grid which allows the food to be stored in the upper compartment above the grid and the exudate from the food such as blood and other fluids drips through the grid and is collected in an absorbent pad disposed therebeneath the lower compartment.

Thus, while the prior art addressed the problem of removing and collecting unwanted liquids from raw food during the dispensing, transporting, and/or storing thereof, none have provided a solution to the removal of the excess oleaginous material which foods acquire during frying or grilling from those foods prior to consumption.

It is toward the resolution of this problem that the present invention is directed.

BRIEF SUMMARY OF THE INVENTION

The present invention provides a novel and unique means and methods for removing excessive grease from grilled or fried foods while substantially reducing the risk of burn which could result from handling foods at such hot temperatures.

More particularly, the present invention comprises an outer plastic grease-resistant cover which is closely and completely lined on the inner surface thereof with an absorbent material which in turn is overlaid with a foraminous heat-resistant liner.

In order to ensure the least possible grease remaining on the fried or grilled foodstuff, it is essential to effectuate the removal process as herein after described, immediately upon completion of the cooking process. This is important because cooking grease and fat are least viscous when at the high temperature used in such cooking operations.

The use of the means and methods of the present invention to degrease fried or grilled food has the further, unexpected benefit of reducing the danger of bodily injury to the cook by isolating the cook from elevated temperature of the cooked food.

Accordingly, it is a prime object of the present invention to provide novel means and methods for handling grease-laden fried or grilled foods whereby excessive grease and oil can be readily and safely removed therefrom without detracting either from the appearance or the wholesomeness of the food processed thereby.

Another object of the present invention, is to provide unique means and methods for effectively degreasing a number of fried foods, and which when no longer needed, can be readily disposed of in an ecologically proper manner.

These and still further objects as shall hereinafter appear, are fulfilled by the present invention in a remarkably unexpected fashion as can be readily discerned from the following detailed description of exemplary embodiments thereof, especially when read in conjunction with the accompanying drawing in which like parts bear like indicia throughout the several views.

DESCRIPTION OF PREFERRED EMBODIMENTS

Figure 1:
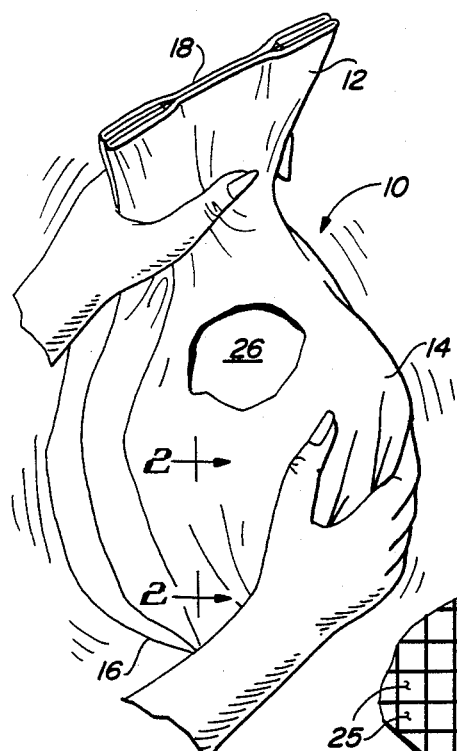
FIG. 1 is a isometric view of a device embodying the present invention.
Figure 2:
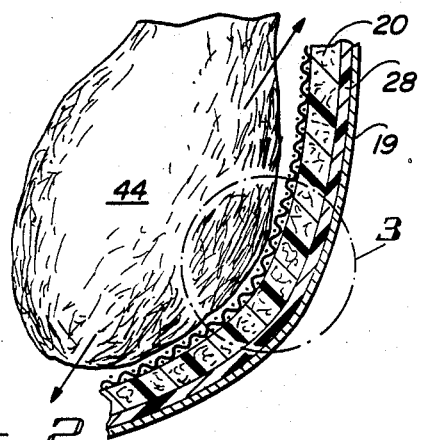
FIG. 2 is a cross-sectional view taken on line 2—2 of FIG. 1.
Figure 3A:
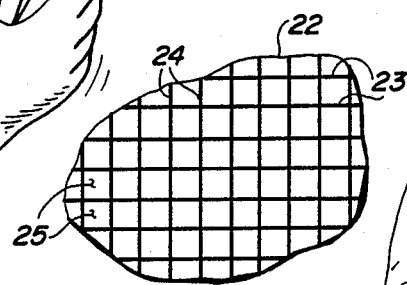
FIG. 3A is a cross-sectional view taken on line 3—3 of FIG. 3.
Figure 3:
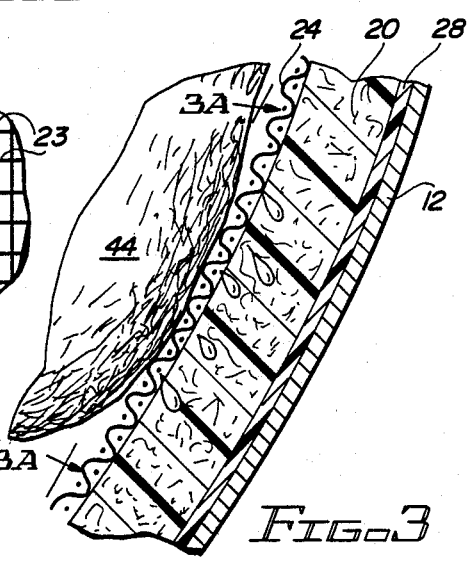
FIG. 3 is an enlargement of that segment of the device hereof within broken circle 3 of FIG. 2.

As shown in the attached drawing, a grease absorbent device embodying the present invention is identified by the general reference 10.

One embodiment of device 10, as shown in FIGS. 1,2,3 and 3A, comprises an outer wrap 12 formed into a bag-like or pouch-like member which is essentially closed at its sides 14 and bottom 16 and has an openable top or mouth 18.

Outer wrap 12 is then covered on the inner surface 19 thereof with a layer 20 formed of a relatively fluffy absorbent material such as cotton fiber and the like suitably secured thereto which is in surface-to-surface engagement therewith by suitable means such as glue, cement, staples and the like. Layer 20 covers and lines the entire inner surface 19 of wrap 12 and terminates in an edge 21 adjacent mouth 18 so that wrap 12 intimately circumscribes.

Absorbent liner 20 is in turn completely overlaid by a foraminous grid or netting 22 formed of a heat resistant weavable material, such for example as polytetrafluoroethylene (sold as TEFLON) and the like. Netting 22 is composed of a plurality of interwoven or overlaid rank 23 and file 24 strands each of which are disposed in spaced generally parallel relationship respectively, to each like rank 23 and file 24 strands and suitably secured to define a plurality of openings 25 therebetween to allow excess grease to pass into its absorbent liner 20 from the interior chamber of pouch 10 when device 10 is manipulated in use as will be hereinafter described.

Figure 4:
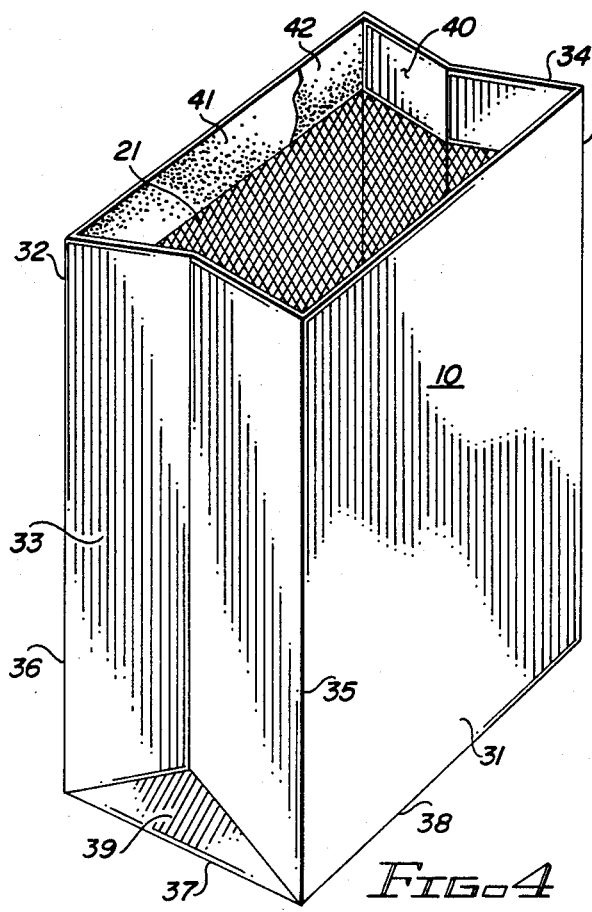
FIG. 4 is an isometric view of an alternative embodiment of a device according to the present invention.
Figure 5:
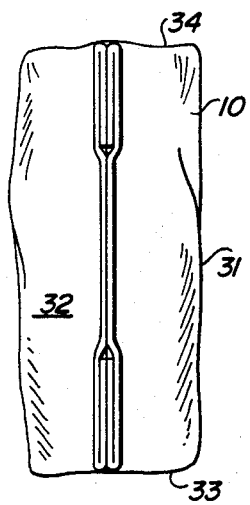
FIG. 5 is a plan view of the device of FIG. 4 with an adhesive closure.
Figure 6:
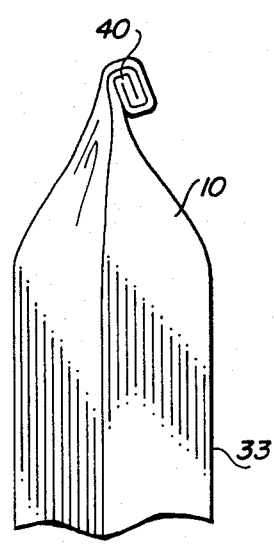
FIG. 6 is a side view of the device of FIG. 4 with alternative closure means.

In another embodiment of the present invention, as shown in FIGS. 4, 5 and 6, outer wrap 12 is formed of a suitable packaging material such as brown Kraft paper and the like and has an impervious liner 28 operatively interposed between surface 19 of wrap 12 and absorbent layer 20 which in turn is overlaid by foraminous grid or netting 22 in the same manner as previously described.

As shown in FIG. 4, device 10 comprises a front panel 31, a rear panel 32, and first and second creased side panels 33, 34 which are operatively interposed between front panel 31 and rear panel 32 and integrally formed therewith along a front longitudinal edge 35 and a rear longitudinal edge 36.

A generally rectangular bottom panel 37 interconnects panels 31, 32, along the lower transverse edge 38 thereof. A pair of triangular shaped gussett-like members 39 (one not shown) are disposed intermediate bottom panel 37 and side panels 33, 34 and integrally formed therewith to permit device 10 to be folded in a generally flat position while awaiting use.

To use, device 10 is opened and panels 31, 32, 33 and 34 are disposed in upstanding relationship to rectangular bottom panel 37. As previously described, device 10 is preferably formed of a tensile strong grease resistant material such as plastic, Kraft paper and the like and is provided with a top opening 40.

In one variation of the embodiment of device 10 just described, a strip 41 of suitable pressure sensitive adhesive is disposed on surface 19 adjacent opening 40 and covered with a shape-confirming strip of release paper 42 formed of cellophane or like materials well known for their release properties. The strip of release paper 42 will be allowed to remain in its original position throughout the useful life of device 10. When the user is ready to discard device 10, paper strip 42 is removed and preferably placed within device 10 to avoid litter. Next, the mouth 40 is closed by folding the upper edges of creased side panels 33, 34 toward each other on their respective creases until the opposing portions of adhesive strip 41 disposed on the several panels 31, 32, 33 and 34 are respectively engaged to sealing closed device 10 as shown in FIG. 4. Device 10 is then ready to be discarded.

Another variation, shown in FIG. 6, involves bringing the upper edges of several panels 31, 32, 33 and 34 into engagement with each other and then literally rolling or folding the upper edge down over itself to close the bag 10 which is now ready for the trash.

When device 10 is completed as described above, it is ready to be used as a grease absorber and termperature moderator in conjunction with the preparation of fried or grilled foods, such as drumstick 44 in the following manner.

Hot fried or grilled food such as drumstick 44 is placed into device 10 through mouth 18 or opening 40. Device 10 is then closed by folding over the upper edges, if configured as a sack as shown in FIG. 4, or by squeezing the upper portion of the bag to close its neck when configured as the bag shown in FIG. 1. When the closed hot food product saturated with grease or cooking oil is then pressed and/or gently shaken within the closed bag device whereupon the liquid, fatty materials carried thereby leave the food and pass through drainage openings 25 in foraminous net liner 22 to be absorbed by absorbent liner 20 and is retained within the bag structure by plastic outer wrap 12. During this pressing-shaking operation, substantially all of the residual grease leaves the foodstuff 44 and is collected and accumulated by liner 20. Simultaneously, any excess heat in the cooked food product is disipated by its free movement in an environment held at ambiant temperature.

Using the foregoing procedure, device 10 can be used for a number of repetitions during a given cooking session, the number of which is dependent solely on the amount of grease the material selected for liner 20 can absorb without the onset of fat oxidation that is, rancidity.

From the foregoing, it becomes readily apparent that all of the aforestated objects of this invention have been fulfilled in a remarkably unexpected manner by the means and methods herein described and illustrated for absorbing excess grease and cooking oil from fried and grilled foods. It is of course understood that such modifications, alterations and adaptations as may readily occur to the skilled artisan confronted with this disclosure are included with the spirit of this invention which is limited solely by the scope of the claims appended hereto.

Accordingly what is claimed is:

1. A device for absorbing grease from fried and grilled food stuffs placed therein without detracting from the appearance or the wholesomeness thereof, said device comprising an exterior body portion having an inner and an outer surface; a grease absorbent non-toxic liner disposed in surface-to-surface engagement on said inner surface of said body portion; and a foraminous netting formed of heat resistant weavable nonmetallic material over laying said absorbent liner and coacting with said body portion to create a sandwich therewith, said foramious netting preventing the engagement of said food stuff with said liner while permitting the passage of grease from said food stuff into said absorbent liner.

2. A device according to claim 1 in which said grease absorbent liner is formed of cotton fiber.

3. A device according to claim 1 in which a grease impervious liner is operatively interposed between said inner surface of said body portion and said absorbent liner.

4. A device according to claim 3 in which said grease absorbent liner is formed of cotton fiber.

5. A device according to claim 3 in which said foraminous netting comprises a plurality of rank strands and file strands operatively interconnected, each of said rank strands being disposed and spaced in a generally parallel relationship to every other rank strand and each of said file strands is being disposed and spaced in a generally parallel relationship to every other file strand.

6. A device according to claim 3 in which said foraminous netting is formed of polytetrafluoroethylene.

7. A device according to claim 1 in which said foraminous netting comprises a plurality of rank strands and file strands operatively interconnected, each of said rank strands being disposed and spaced in a generally parallel relationship to every other rank strand and each of said file strands is being disposed and spaced in a generally parallel relationship to every other file strand.

8. A device according to claim 1 in which said foraminous netting is formed of polytetrafluoroethylene.

9. A device according to claim 1 in which said body portion comprises a grease imperious plastic pouch.

10. A device according to claim 9 in which said grease absorbent liner is formed of cotton fiber.

11. A device according to claim 9 in which said foraminous netting comprises a plurality of rank strands and file strands operatively interconnected, each of said rank strands being disposed and spaced in a generally parallel relationship to every other rank strand and each of said file strands being disposed and spaced in a generally parallel relationship to every other file strand.

12. A device according to claim 9 in which said forminous netting is formed of polytetrafluoroethylene.

13. A grease absorbing device comprising an exterior body portion having an inner and an outer surface; an abosrbent liner disposed in surface-to-surface engagement on said inner surface of said body portion; and a foraminous netting disposed over said absorbent liner and coacting with said body portion to create a sandwich therewith, said foraminous netting being formed of polytetrafluoroethylene.

14. A grease absorbing device comprising an exterior body portion having an inner and an outer surface; an absorbent liner disposed in surface-to-surface engagement on said inner surface of said body portion; an impervious liner operatively interposed between said inner surface of said body portion and said absorbent liner; and a foraminous netting disposed over said absorbent liner and coacting with said body portion to create a sandwich therewith, said foraminous netting being formed of polytetrafluoroethylene.

15. A grease absorbing device comprising an exterior body portion forming a grease impervious plastic pouch and having an inner and an outer surface; an absorbent liner disposed in surface-to-surface engagement on said inner surface of said body portion; and a foraminous netting formed of polytetraflurooethylene and disposed over said absorbent liner and coacting with said body portion to create a sandwich therewith.

* * * * *